United States Patent [19]

Müller et al.

[11] 4,416,409

[45] Nov. 22, 1983

[54] METHOD FOR MANUFACTURING A METAL CASING FOR GATE VALVES USED IN NUCLEAR REACTORS AND THE LIKE

[75] Inventors: Erwin Müller, Herdecke; Bernd Kollmann, Witten-Stockum; Ferdinand Sonnabend, Dortmud; Gert Petzolt, Nordkirchen; Josef Balz, Castrop-Rauxel; Bernhard Walloschek, Witten-Stockum; Friedrich Risse, Bochum-Querenburg, all of Fed. Rep. of Germany

[73] Assignee: Thyssen Industrie AG, Fed. Rep. of Germany

[21] Appl. No.: 204,545

[22] Filed: Nov. 6, 1980

Related U.S. Application Data

[62] Division of Ser. No. 87,950, Oct. 25, 1979, Pat. No. 4,319,736.

[30] Foreign Application Priority Data

Nov. 2, 1978 [DE] Fed. Rep. of Germany ....... 2847579

[51] Int. Cl.³ .............................................. B23K 28/02
[52] U.S. Cl. ........................... 228/173 R; 29/157.1 R; 228/104
[58] Field of Search ............... 228/173 R, 173 C, 104; 73/622; 29/157.1 R

[56] References Cited

U.S. PATENT DOCUMENTS

| 2,656,143 | 10/1953 | Fantz | 29/157.1 R X |
| 3,769,673 | 11/1973 | Siepmann | 29/157.1 R |
| 3,975,810 | 8/1976 | Siepmann | 228/104 X |

FOREIGN PATENT DOCUMENTS

| 2114068 | 10/1972 | Fed. Rep. of Germany | 228/173 R |
| 1338975 | 8/1963 | France | 251/329 |
| 423277 | 8/1947 | Italy | 29/157.1 R |

Primary Examiner—Kenneth J. Ramsey
Attorney, Agent, or Firm—McGlew and Tuttle

[57] ABSTRACT

A method and apparatus of manufacturing a metal casing, particularly for accessories, such as steel casings, and preferably gate valves which can be employed in installations requiring high safety measures and testing with testing heads, the casings having large nominal widths and particularly usable in nuclear reactors and the like, comprising, permanently deforming a bloom into a tubular body having one open end and an opposite closed end, deforming at least a portion of the tubular body to form at least two diametrically opposed sides thereof which are planar on their interior and exterior surfaces, forming a port in at least one of the planar ends having a diameter less than that of the diametrically opposed sides to leave an approach area around the port and connecting a pipe connection to the port by a single welding seam which can be tested with a testing head which can approach the seam in the approach area. A casing made in accordance with the method is also disclosed.

1 Claim, 10 Drawing Figures

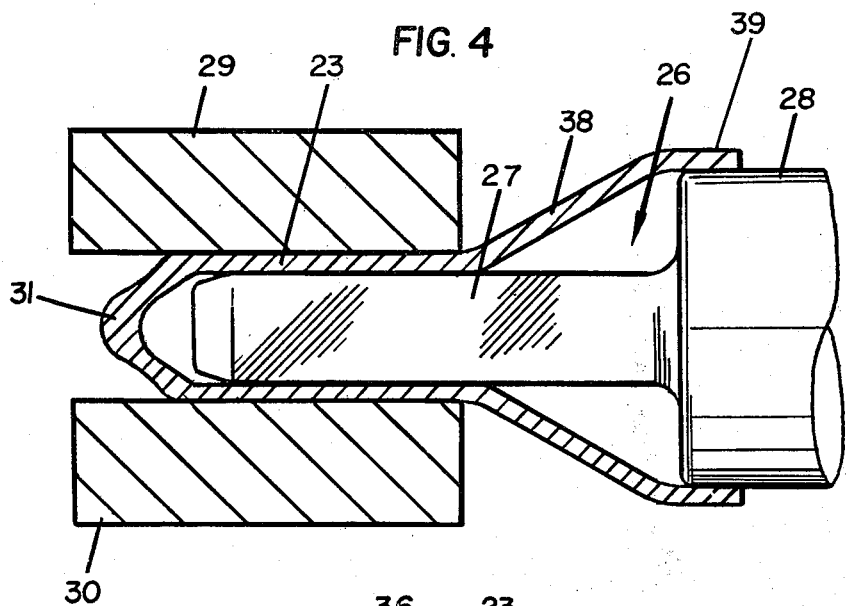
FIG. 4
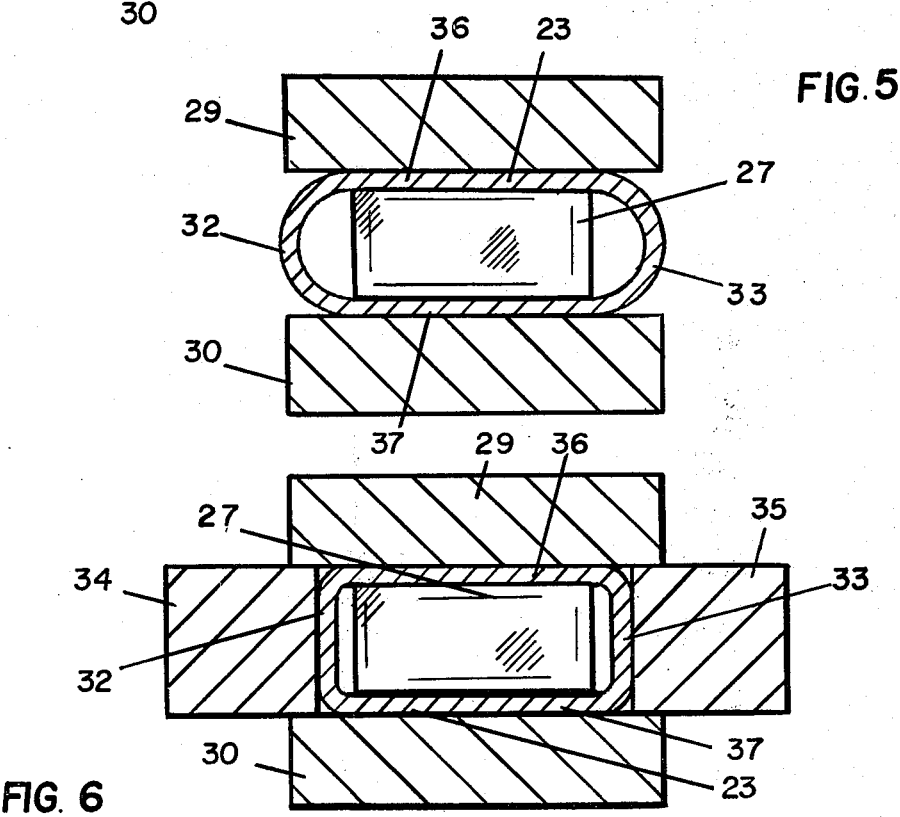
FIG. 5
FIG. 6

METHOD FOR MANUFACTURING A METAL CASING FOR GATE VALVES USED IN NUCLEAR REACTORS AND THE LIKE

The present invention is a division of application Ser. No. 87,950, filed Oct. 25, 1979, now issued into U.S. Pat. No. 4,319,736 of Mar. 16, 1982.

FIELD AND BACKGROUND OF THE INVENTION

The present invention relates in general to casings for accessories, such as steel casings for gate valves, and a method and apparatus for making the same and, in particular, to a new and useful casing particularly for gate valves which have a relatively large or very large width which are usable in installations requiring high and very high safety measures, such as those required in the manufacture or construction of a nuclear reactor, and to a method and apparatus for making the same.

Gate valve casings used in the construction of nuclear reactors, which have from large, to very large widths, such as from 300 mm to 600 mm, have been manufactured by working, e.g., by milling, the entire casing out of a steel bloom, for example, and this construction entails very high costs.

Gate valve casings of such large nominal widths and for satisfying safety conditions have also been made by longitudinally welding two casing parts together, The valve seat rings cooperating with the shutoff member, thus with the gate, are also welded to the casing, in the interior thereof. Also welded to the casing are pipe connections for connecting to the piping proper. A flange is eventually welded to the top of the casing, to which a collar may be secured by screws. However, there are also known constructions where such covers are fitted in grooves so that no welded flanges are needed.

With gate valves used under increased safety conditions, such as in nuclear plants, the welding seams must meet the highest requirements of quality. This involves the necessity of providing for the possibility of radiographic and also ultrasonic inspection. Such a possibility, however, is not provided for in the prior art constructions since, for example, in the last-mentioned construction, the location of the welded seams does not permit X-ray and ultrasonic tests. More particularly, sufficient distance of approach is not available for the test head of such ultrasonic test instruments, and it is equally difficult to take radiographs with the prior construction.

Since, in conventional gate valve casings having such large nominal widths, six or even more welding seams are frequently provided between the fairly large number of individual parts welded together, such a construction cannot properly be used under the required safety conditions.

Numerous other casings for accessories, particularly for gate valves, are known, however, which cannot be employed in safety zones, such as nuclear plants, since they are small in size and, in addition, have welded seams which are inaccessible for radiographic and ultrasonic inspection. Additionally, many of these constructions are rather expensive since they are made of a plurality of individual parts which must undergo relatively high-grade machining and are unsuitable for larger or very large casings, for example, of a nominal width of 300 mm to 1,000 mm.

The following references are cited as of interest to the present invention:

"Advanced Technology of Fittings particularly With Regard to the Quality Control" by W. Kranert, "3R International", Vol. 15, No. 9, September, 1976, pages 530 to 535;

"Manual of Welding" by Paul Schimpke and Hans A. Horn, Third Edition, publishers Springer-Berlin 1943, pages 173/180;

"Welding of Iron Materials" by Ludwig Zeyen and Wilhel Lohmann, Second Edition, 1948, publishers, Stahleisen mbH, Dusseldorf, page 297;

German Pat. Nos. 755,989; 973,519; 1,928,585 and 1,000,652;

German Auslegungschrift Nos. 2,032,132; 1,425,710; 2,164,929 and 2,354,246;

Published Patent Application No. S 28 115 XII/47g; Class 47 g, Groups 39 01;

German Offenlegungschrift Nos. 2,057,746; 1,928,686; 2,114,068 and 2,041,333; and German Utility Model No. 7,031,192.

SUMMARY OF THE INVENTION

The present invention is directed to a solution for the problem of manufacturing metal casings for accessories, particularly steel cases, preferably for gate valves, which can be employed in installations requiring very high safety measures, such as those required in the construction of nuclear reactors and where the casings have relatively large nominal widths, for example of about 300 mm to 1,000 mm.

The present invention is drawn to a relatively simple method which is capable of providing a product which is suitable, for example, in the construction of nuclear reactors requiring a maximum of safety. Any welding seams used are made accessible to radiographic and ultrasonic inspections.

The inventon is further directed to a casing for accessories, preferably for a gate valve, having a large to very large width, preferably in the mentioned range of 300 mm to 1,000 mm. The casing must be accessible for repeated inspections, as frequently as is necessary, even under operating conditions created by the required degree of safety, thus without dismounting or dismantling, for example, in nuclear plants. The possibility of making any number of ultrasonic tests is insured, for example, and subject even welding seams to inspection, if such are provided. The casing is relatively simple in construction, is assembled of a relatively small number of individual parts and is thus relatively inexpensive to manufacture.

The inventive method makes it possible to manufacture casings for accessories, particularly for gate valves, which need no longer be welded together of a plurality of parts, as before. The invention makes it possible to manufacture single part casings having large to very large diameters, for example, from 300 mm to 1,000 mm, and preferably up to about 600 mm.

A particular advantage of the invention is that, due to the forming operation, walls with a relatively large, plane surface area can be obtained on at least two opposite sides of the casing, in which one or more openings may be provided to weld pipe connections for the casing thereto, if needed. Since the diameter of the welded pipe connections is considerably, or very much smaller than the width of the plane walls, the welding seams become easily accessible to radiographic and ultrasonic inspections. For example, the head of an ultrasonic test instrument can be easily advanced along the plane surface area remaining free on the wall around a pipe connection, so that a completely satisfactory test characteristic is obtained.

Casings manufactured in this way and employed, for example, for gate valves in nuclear plants, can be inspected repeatedly any number of times, even under operating conditions. It is, therefore, easily possible to test the welded seams of pipe connections of the casing, which may extend coaxially with and diametrically opposite to each other as many times as needed, and during operation.

It is particularly advantageous that, in practice, any size of the plane wall surfaces may be provided, depending on the size of the casing, for example, for a gate valve, the location of the welded seams, and the applied testing method, since what is needed to accomplish this end is only the deformation of the initial tubular body along the respective portion of its length in the inventive manner, so as to obtain at least two diametrically opposite plane or planar wall surfaces. These planar wall surfaces also make it possible to provide inside and/or outside chamfering or other machining, should such a shape modification be necessary or desired under specific operating conditions.

In accordance with the invention, there is provided a method for manufacturing the casing, comprising, permanently deforming a bloom into a tubular body having one open end and a closed opposite end, deforming at least a portion of the tabular body at two diametrically opposite sides thereof to form a pair of planar wall portions, each having planar interior and exterior surfaces, forming a port in at least one of the wall portions having a diameter less than the width of the at least one wall portion to leave a planar approach area in the vicinity of the port, and connecting a pipe connection to the port by forming a welded seam, whereby, a test head, for example, an ultrasonic or radiographic test head, can be used in this approach area to test the integrity of the welded seam as well as the boundary area between the welded seam and the wall portion.

If the present method is applied to the manufacture of large gate valve casings intended for safety zones, such as nuclear plants, the casing will, as a rule, have two diametrically opposite pipe connections with facing parts. A shutoff member (closing wedge) will perform its function between these ports. Even in such a case, in contradistinction to the prior art, very few welded seams are needed, in fact, only one for each pipe connection, thus, a total of two seams, which are fully accessible to radiographic and ultrasonic inspection are used, while hitherto, six and more welding seams were necessary for such large gate valve casings having a nominal width, for example, of 300 mm to 600 mm.

In a particularly advantageous variation of the inventive method, the blank is worked or drawn to a tubular seamless initial body in a suitable hot-working process, such as, expanding on a mandrel. The initial body may then be calibrated, for example, by passing it through a draw ring. The seamless tubular body thus produced is then worked, at least from two opposite sides, for example, by pressing it flat, in the above-described manner, and preferably, also in a hot-working process.

An equally advantageous embodiment of the invention is one in which, simultaneously with or immediately after the forming of two diametrically opposite planar walls, two other planar walls are formed, which are also diametrically opposite to each other and may extend at right angles to the first-mentioned pair of planar walls, so that a substantially rectangular inside and outside contour is obtained. In this way, large approach surfaces for the head of an ultrasonic test instrument are obtained with relatively small transverse dimensions of the initial tubular body.

According to a still further embodiment of the invention, a mandrel-like tool, having a rectangular cross-sectioned portion and a cylindrical portion is pressed into the tubular body, and a pair of forging or pressing tools are applied against the outside surfaces of the tubular body and against opposite flat surfaces of the rectangular portion of the mandrel-like tool to form the pair of planar wall portions with the casing including a cylindrical portion extending from the planar wall portions surrounding the cylindrical portion of the mandrel-like tool.

Another feature of the invention includes providing the pipe connection with a collar or flange portion which is welded to the wall portion of the casing.

Where the casing is to be used particularly for a gate valve construction, two additional diametrically opposed planar wall portions are formed on opposite sides of the two first-mentioned opposite planar wall portions, with the port being provided in at least one of the wall portions having the pipe connection connected thereto by welding, the pipe having a projecting portion projecting into the interior of the casing and forming a valve seat. The two pairs of planar wall portions form a polygonal cross-sectioned portion of the casing in the area of the valve seat and extends upwardly to form a frusto conical portion integral with the rectangular portion which terminates at a cylindrical portion which is hermetically closed and sealed.

The inventive casing for accessories has a minimum number of welded seams, even if, as frequently occurs, two coaxially extending pipe connections are provided on the casing, approximately in the middle of its longitudinal extension. For this reason, the inventive casing, having a nominal width of for example about 300 mm up to 1,000 mm and, preferably, 300 mm to 600 mm, can very advantageously be employed in the construction of nuclear reactors. It is no longer necessary to mill such a casing for a gate valve out of a solid bloom, as in the prior art. An inventive casing for a gate valve, for example, is therefore relatively inexpensive as compared to the prior art designs, while still complying with all of the requirements for maximum safety.

Another embodiment of the invention provides an approach distance around the connected pipe connection for permitting the approach of a test head, such as an ultrasonic or radiographic test instrument, where the approach distance is $A = 2 \tan \alpha \times s + 15$ mm, where A is the distance of approach for the test head, $\alpha$ is the angle of radiation for the test head in the direction of the welded seam, and s is the wall thickness in the zone of the wall to be tested. The surface of the approach area is machined inside and out to permit an accurate testing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a similar view showing the manner in which the planar walls are formed;

FIG. 5 is a transverse sectional view of the invention shown in FIG. 4;

FIG. 6 illustrates another embodiment of the inventive method in which a portion of the casing is pressed into a shape with four planar sides;

DESCRIPTION OF THE PREFERRED EMBODIMENTS

Figure 1:
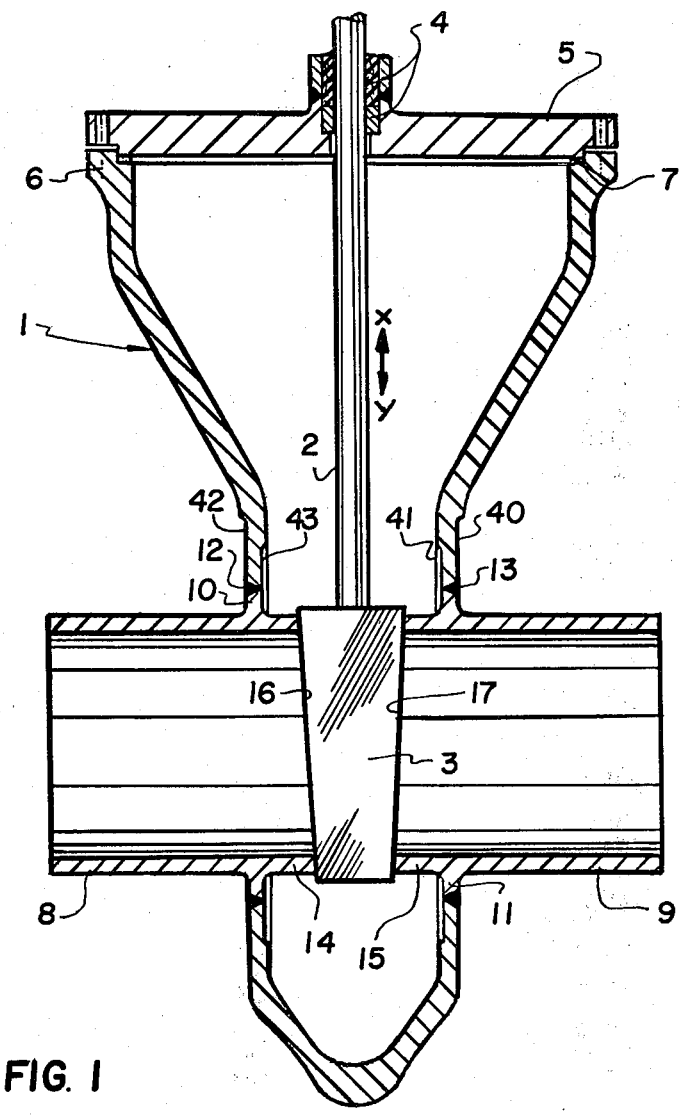
FIG. 1 is a longitudinal sectional view of a gate valve constructed in accordance with the invention.

The drawings show the invention as applied to a large gate valve casing to be employed in nuclear plants. In a gate valve casing, generally designated 1 in FIG. 1, a valve stem 2, carrying a shutoff member 3 in the form of a closing wedge is movable in directions X and Y. Stem 2 is mounted for displacement in a cover 5 of the casing, where it is sealed by a suitable packing 4. By means of several screws (not shown) cover 5 is firmly, but removably, secured to an upset flange 6 of valve casing 1 and is hermetically sealed against fluid under pressure. A suitable seal is shown at 7.

Coaxially extending pipe connections 8 and 9 are provided on diametrically opposite sides of the casing, each having a circular collar 10, 11 which is welded rigidly and in a manner sealed against pressure fluid to casing 1 by seam 12, 13 in a manner described hereinafter. The inside end portions 14, 15 of pipe connections 8, 9 extend into the interior of casing 1 and form valve seats 16, 17 for a shutoff member 3. Connections 8, 9 are secured to pipes on their outside, in a manner known per se and has not been shown. Instead of an upset rim 6, as shown in FIG. 1, the valve casing may also have a cylindrical top portion with one or more grooves on the inside in which casing cover 5 is secured and sealed against pressure fluid.

In the following, the manufacture of casing 1 is explained in more detail with reference to FIGS. 2 to 6.

Figure 2:
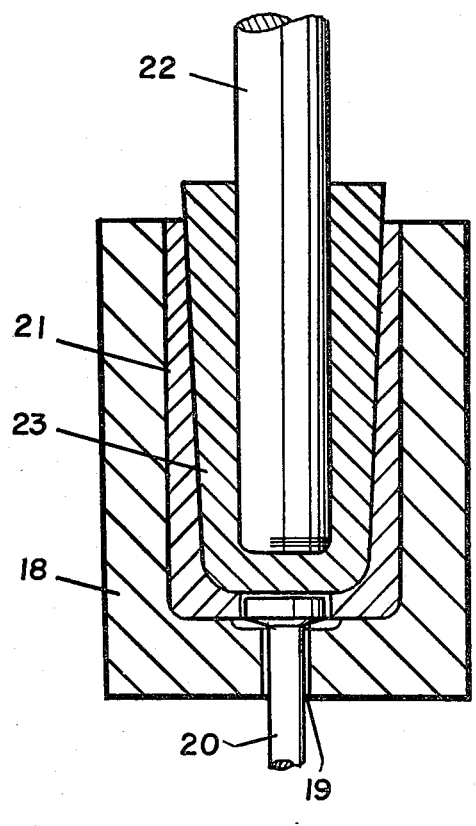
FIG. 2 is a similar, but partial view showing the manner in which the tubular initial body is formed in a die.
Figure 3:
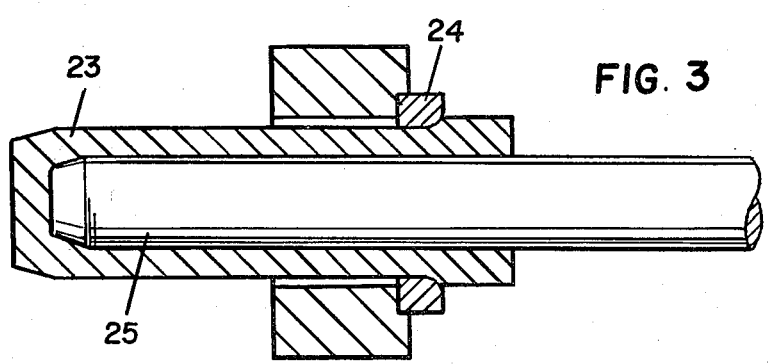
FIG. 3 is a similar view showing the manner in which the tubular initial body is calibrated.

FIG. 2 shows an upwardly open die pot 18 having a central hole 19 in its bottom, through which an ejector 20 extends. A die 21 snugly fits the inside wall surface of pot 18 and is also open at its top, as viewed in FIG. 2. The hot bloom is brought in front of the opening of die 21 and is hot-worked or formed by means of a mandrel 22 to a tubular initial or blank body 23, as shown in FIG. 2. If necessary, upon reheating, the body 23 is calibrated by passing it through a ring die 24 (FIG. 3), by means of a mandrel rod 25. A tubular, seamless body is thus formed which is open on one side and has the desired wall thickness.

According to FIG. 4, a tool 26 is introduced into tubular initial body or blank 23, which comprises two portions 27 and 28 having unequal cross-sections. Portion 27 has a rectangular cross-section formed by planar walls, while portion 28, which is integral with portion 27, is cylindrical. As can also be seen from FIG. 4, two forging or pressing jaws 29, 30 having planar surfaces are moved against the respective portions of body 23, so that this portion is worked to the shape of tool portion 27 and applies thereto. At the same time, the outside surfaces of portion 23 are pressed flat by the forging tools. The closed end 31 of initial body 23 is thereby shaped to a protruding rib, due to the plastic flow of material.

FIG. 5 shows clearly that, in this embodiment, the portion of body 23 coming into contact with the forging jaws 29 and 30 is formed into two diametrically opposite walls 36, 37, which are planar on both their inside and outside surfaces, while the other two sides 32 and 33, opposing each other, are forced to an approximately semicircular, outwardly curved shape. If these sides 32 and 33 are also worked by forging or forming tools 34, 35, moving toward each other, as shown in FIG. 6, they also become planar. Relatively small rounded edges remain only at the edges between walls 32, 33 and walls 36, 37. Tubular initial body 23 is thus formed, in this portion of its length, into an outwardly and inwardly substantially rectangular section.

In both the embodiment of FIGS. 4 and 5 and of FIG. 6, the portion with plane surfaces 36, 37 (FIG. 5), or plane surfaces 32, 33 (FIG. 6), is followed by a tapering portion 38, and then by a cylindrical portion 39. The cylindrical portion is backed by the portion 28 of tool 26 so that it cannot be deformed. The wall portions in the area of the cylindrical opening may be cold-headed or hot-headed to form a kind of flange, as shown in FIG. 1, to which a cover for the casing may be connected.

With the working operation illustrated in FIGS. 2 to 6 terminated, or even in the course of one or some of the operating steps, ports for the pipe connections 8 and 9, or a single port, may be machined in the casing. As particularly clearly shown in FIG. 1, very large approach surfaces for the head of an ultrasonic test instrument are obtained, so that welding seams 12, 13 may be subjected not only to radiographic inspections, but also to ultrasonic inspections.

In all of the embodiments shown, the planar walls, for examples, the walls 36 and 37, may be finish-machined, on their entire outer and/or inner surface areas, or partly finished, to obtain precision surfaces of the highest practicable quality to set the head of an ultrasonic test instrument. For example, in the embodiment of FIG. 1, the planar surfaces have been subsequently machined at locations 40, 41 and 42, 43, prior to making a welded seam.

Figure 8:
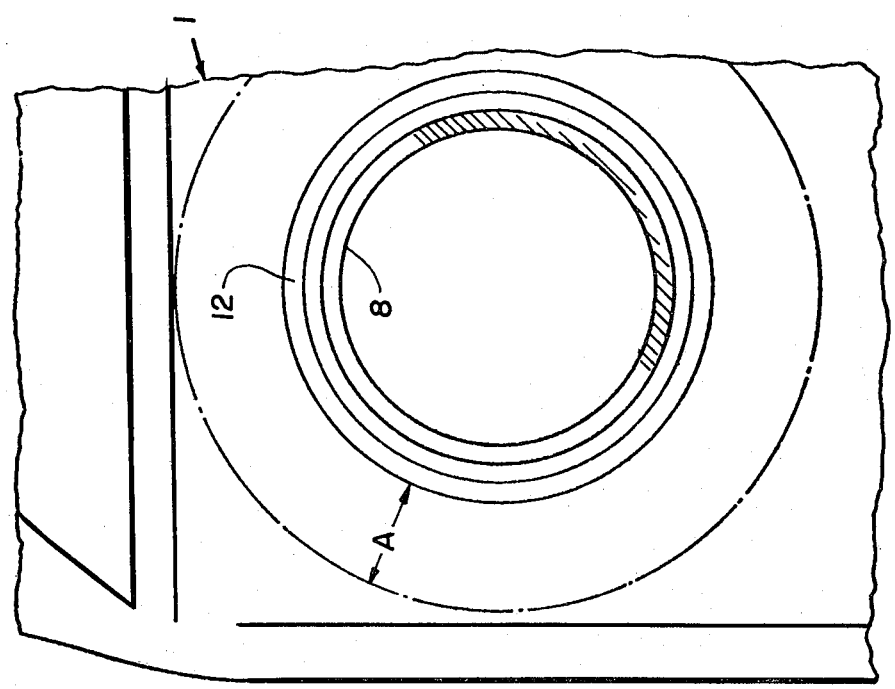
FIG. 8 is a partial elevation of the invention shown in FIG. 7.
Figure 7:
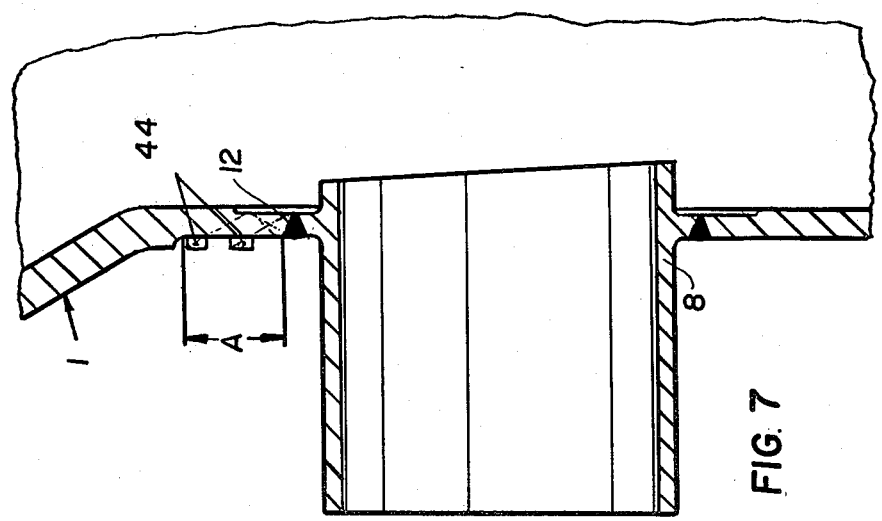
FIG. 7 is an enlarged sectional view of a detail from FIG. 1.

It may be learned from FIG. 7 that the head of an ultrasonic test instrument 44 can be approached through a distance A to test a welded seam 12. The distance A for test head 44 results from the following relation:

$$A + 2 \tan \alpha \times s + 15 \text{ mm}$$

wherein: $\alpha$ is the angle at which test head 44 transmits ultrasound into the wall of the valve casing, in the direction of welded seam 12, and s is the wall thickness in the area where test head 44 can operate. If necessary, a mean wall thickness is introduced (See FIGS. 7 and 8).

Figure 10:
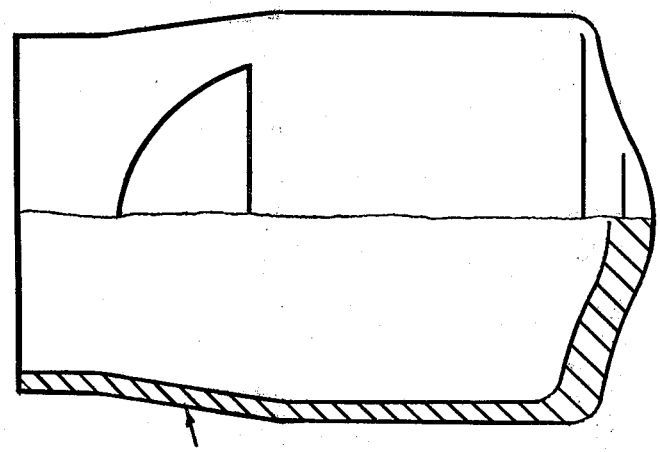
FIG. 10 is a partial sectional side view of the embodiment shown in FIG. 9.
Figure 9:
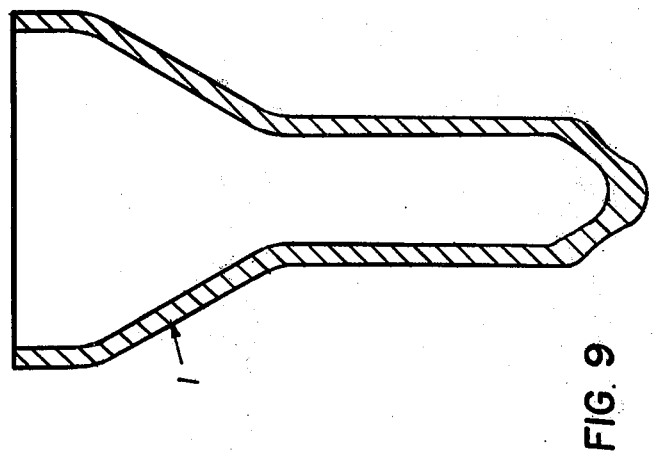
FIG. 9 is a longitudinal sectional view of a gate casing which has not yet been provided with openings for the pipe connections.

FIGS. 9 and 10 show gate valve casing 1 without the ports, in its shape after producing the planar surfaces.

While specific embodiments of the invention have been shown and described in detail to illustrate the application of the principles of the invention, it will be understood that the invention may be embodied otherwise without departing from such principles.

What is claimed is:

1. A method of manufacturing a forged metal casing for accessories which can be employed in installations requiring high safety measures and which must be tested with a testing device and using a die, comprising the steps of introducing a bloom into the die and using a mandrel to hot-work the bloom so as to form it into a tubular body having open end and a closed opposite end, inserting a tool having both a rectangular cross-sectional portion and a cylindrical cross-sectional portion into the tubular body, and hot-working the tubular body so as to deform it at at least two diametrically opposed sides thereof to form interior planar surfaces of the planar wall portions thereof with the cylindrical portion of the tool bearing against the cylindrical portion of the tubular body at a location spaced from said planar wall portions, forming a port in at least one of the wall portions having a diameter less than that of the width of the at least one wall portion to leave a planar approach area therearound, and connecting a pipe connection to the port with a welding seam in a manner so that the test device can be used to test the welded seam and the boundary between the welded seam and at least one wall portion.

* * * * *